United States Patent
Kweon et al.

(10) Patent No.: US 11,399,397 B2
(45) Date of Patent: Jul. 26, 2022

(54) APPARATUS AND METHOD FOR HANDLING PDU SESSION IN WIRELESS COMMUNICATION SYSTEM

(71) Applicant: Samsung Electronics Co., Ltd., Suwon-si (KR)

(72) Inventors: Kisuk Kweon, Suwon-si (KR); Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/994,505

(22) Filed: Aug. 14, 2020

(65) Prior Publication Data

US 2021/0051739 A1   Feb. 18, 2021

(30) Foreign Application Priority Data

Aug. 16, 2019   (KR) .................. 10-2019-0100608

(51) Int. Cl.
| | | |
|---|---|---|
| *H04W 76/10* | (2018.01) | |
| *H04W 28/02* | (2009.01) | |
| *H04W 28/10* | (2009.01) | |
| *H04L 27/26* | (2006.01) | |
| *H04W 80/02* | (2009.01) | |

(52) U.S. Cl.
CPC ....... *H04W 76/10* (2018.02); *H04W 28/0268* (2013.01); *H04W 28/10* (2013.01); *H04L 27/2601* (2013.01); *H04W 80/02* (2013.01)

(58) Field of Classification Search
CPC .. H04L 27/2601; H04L 1/00; H04W 28/0268; H04W 28/10; H04W 76/10; H04W 80/02; H04W 76/12; H04W 28/02; H04W 80/10; H04W 76/20
See application file for complete search history.

(56) References Cited

U.S. PATENT DOCUMENTS

| | | | |
|---|---|---|---|
| 10,455,551 B2 | 10/2019 | Jang et al. | |
| 2018/0198867 A1 | 7/2018 | Dao et al. | |
| 2020/0092380 A1* | 3/2020 | Lee | H04W 76/10 |
| 2020/0113002 A1* | 4/2020 | Huang-Fu | H04W 12/06 |

(Continued)

FOREIGN PATENT DOCUMENTS

KR   10-2018-0050015 A   5/2018

OTHER PUBLICATIONS

Huawei, HiSilicon, "Clarifications on URLLC support", Change Request, 3GPP TSG-SA WG2 Meeting #134, Jun. 24-28, 2019, S2-1907632, 5 pages.

(Continued)

*Primary Examiner* — Nathan S Taylor

(57) ABSTRACT

The disclosure relates to a 5$^{th}$ generation (5G) or pre-5G communication system to support a higher data rate after a 4$^{th}$ generation (4G) communication system such as long term evolution (LTE). Various embodiments provide a method for operating a terminal in a wireless communication system, the method including: transmitting a PDU session establishment request message to a network node; receiving a PDU session establishment accept message from the network node; and determining a PDU session as an always-on PDU session for an URLLC service.

8 Claims, 8 Drawing Sheets

(56) References Cited

U.S. PATENT DOCUMENTS

| | | | |
|---|---|---|---|
| 2020/0213897 A1* | 7/2020 | Qiao | H04L 12/1407 |
| 2020/0214054 A1* | 7/2020 | Qiao | H04W 48/18 |
| 2021/0076444 A1* | 3/2021 | Shu | H04W 76/25 |
| 2021/0100061 A1* | 4/2021 | Park | H04W 28/0268 |
| 2021/0153286 A1* | 5/2021 | Park | H04W 28/24 |
| 2021/0212021 A1* | 7/2021 | Youn | H04W 68/005 |
| 2021/0235517 A1* | 7/2021 | Won | H04W 80/10 |

OTHER PUBLICATIONS

LG Electronics, "Clarification on RSN allocation between two SMFs (Option 2)", Change Request, 3GPP TSG-SA2 Meeting #134, Jun. 24-28, 2019, S2-1907692, 3 pages.

Oppo, "Clarifications on URLLC support", Change Request, 3GPP TSG-SA WG2 Meeting #134, Jun. 24-28, 2019, S2-1907160, 5 pages.

"Non-Access-Stratum (NAS) protocol for 5G System (5GS); Stage 3", 3GPP TS 24.501 V16.1.0 (Jun. 2019), 541 pages.

International Search Report dated Nov. 27, 2020 in connection with International Patent Application No. PCT/KR2020/010919, 3 pages.

Written Opinion of the International Searching Authority dated Nov. 27, 2020 in connection with International Patent Application No. PCT/KR2020/010919, 5 pages.

* cited by examiner

APPARATUS AND METHOD FOR HANDLING PDU SESSION IN WIRELESS COMMUNICATION SYSTEM

CROSS-REFERENCE TO RELATED APPLICATION

This application is based on and claims priority under 35 U.S.C. 119 to Korean Patent Application No. 10-2019-0100608, filed on Aug. 16, 2019, in the Korean Intellectual Property Office, the disclosure of which is herein incorporated by reference in its entirety.

BACKGROUND

1. Field

The disclosure generally relates to a wireless communication system, and more particularly to an apparatus and a method for handling a PDU session in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

5G communication system can support various terminals/services. Examples of terminals/services supported by the 5G communication system include enhanced mobile broadband (eMBB), ultra-reliable low latency communication (URLLC), massive machine type communication (mMTC), and the like. Each of the terminals/services has different requirements for a core network. In particular, an URLLC service requires high stability and low latency.

The above information is presented as background information only to assist with an understanding of the disclosure. No determination has been made, and no assertion is made, as to whether any of the above might be applicable as prior art with regard to the disclosure.

SUMMARY

Based on the discussion as described above, the disclosure provides an apparatus and method for handling a PDU session in a wireless communication system.

According to various embodiments, a method for operating a terminal in wireless communication system is provided. The method includes: transmitting a PDU session establishment request message to a network node; receiving a PDU session establishment accept message from the network node; and determining the established PDU session as an always-on PDU session for an URLLC service.

According to various embodiments, a method for operating a network node in a wireless communication system is provided. The method includes: receiving a PDU session establishment request message from a terminal; determining whether the PDU session establishment request message relates to a PDU session for URLLC; and transmitting a PDU session establishment accept message to the terminal.

According to various embodiments, an apparatus for a terminal in a wireless communication system is provided. The apparatus includes: at least one transceiver; and at least one processor, wherein the at least one processor is configured to; transmit a PDU session establishment request message to a network node; receive a PDU session establishment accept message from the network node; and determine the established PDU session as an always-on PDU session for an URLLC service.

According to various embodiments, an apparatus for a network node in a wireless communication system is provided. The apparatus includes: at least one transceiver; and at least one processor, wherein the at least one processor is configured to: receive a PDU session establishment request message from a terminal; determine whether the PDU session establishment request message relates to a PDU session for URLLC; and transmit a PDU session establishment accept message to the terminal.

Various embodiments may provide an apparatus and method for handling a PDU session in a wireless communication system.

Effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for handling a PDU session in a wireless communication system.

In the following description, terms referring to channels, terms referring to control information, terms referring to network entities, terms referring to elements of a device, etc. are provided for convenience of explanation. Therefore, the disclosure is not limited to the terms described below, and other terms having equivalent technical meanings may be used.

In addition, the disclosure describes various embodiments using terms used in some communication standards (e.g., 3rd generation partnership project (3GPP)), but this is only an example for explanation. Various embodiments can be easily modified and applied in other communication systems.

Figure 1:
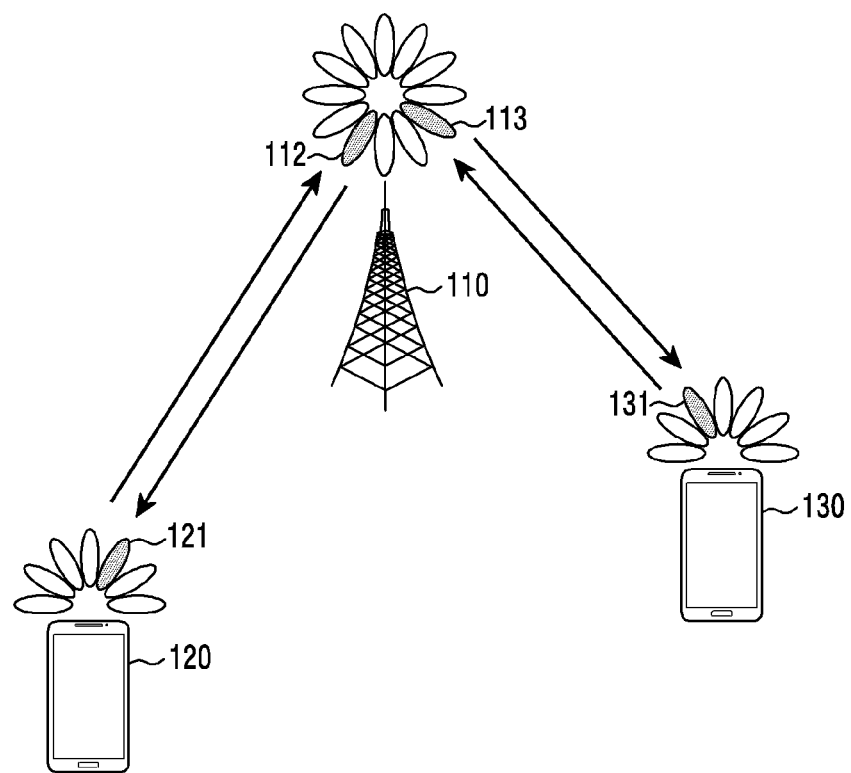
FIG. 1 illustrates a wireless communication system according to various embodiments.

FIG. 1 illustrates a wireless communication system according to various embodiments. FIG. 1 exemplifies a base station 110, a terminal 120, and another terminal 130 as some of nodes using a wireless channel in the wireless communication system. FIG. 1 illustrates only one base station, but may further include another base station which is the same as or similar to the base station 110.

The base station 110 is a network infrastructure which provides wireless connection to the terminals 120 and 130. The base station 110 has a coverage which is defined as a specific geographical area based on a distance capable of transmitting a signal. The base station 110 may be denoted as, besides the base station, an "access point (AP)", an "eNodeB (eNB)", a "5th generation node (5G)", a "next generation nodeB (gNB)", a "wireless point", a "transmission/reception point (TRP)", or other terms having technological meanings equivalent to these.

Each of the terminal 120 and the terminal 130 is a device used by a user and performs communication with the base station 110 through a wireless channel. According to cases, at least one of the terminal 120 and the terminal 130 may be managed without a user's engagement. That is, at least one of the terminal 120 and the terminal 130 is a device performing machine type communication (MTC) and may not be carried by the user. Each of the terminal 120 and the terminal 130 may be denoted as, besides the terminal, a "user equipment (UE)", a "mobile station", a "subscriber station", a "remote terminal", a "wireless terminal", or a "user device" or other terms having technological meanings equivalent to these.

The base station 110, the terminal 120, and the terminal 130 may transmit or receive a wireless signal at a band of mmWave (e.g., 28 GHz, 30 GHz, 38 GHz, and 60 GHz). At this time, for the sake of improvement of a channel gain, the base station 110, the terminal 120 and the terminal 130 may perform beamforming. Here, the beamforming may include transmission beamforming and reception beamforming. That is, the base station 110, the terminal 120 and the terminal 130 may grant directivity to a transmission signal or a reception signal. To this end, the base station 110 and the terminals 120 and 130 may select serving beams 112, 113, 121, and 131 through a beam search or beam management procedure. After the serving beam is selected, subsequent communication may be performed through a resource which is in a quasi-co-located (QCL) relation with a resource of transmitting the serving beam 112, 113, 121, and 131.

If large-scale characteristics of a channel transferring a symbol on a first antenna port are inferred from a channel transferring a symbol on a second antenna port, the first antenna port and the second antenna port may be evaluated as being in a QCL relation. For example, the large-scale characteristics may include at least one of a delay spread, Doppler spread, Doppler shift, an average gain, an average delay, and a spatial receiver parameter.

Figure 2:
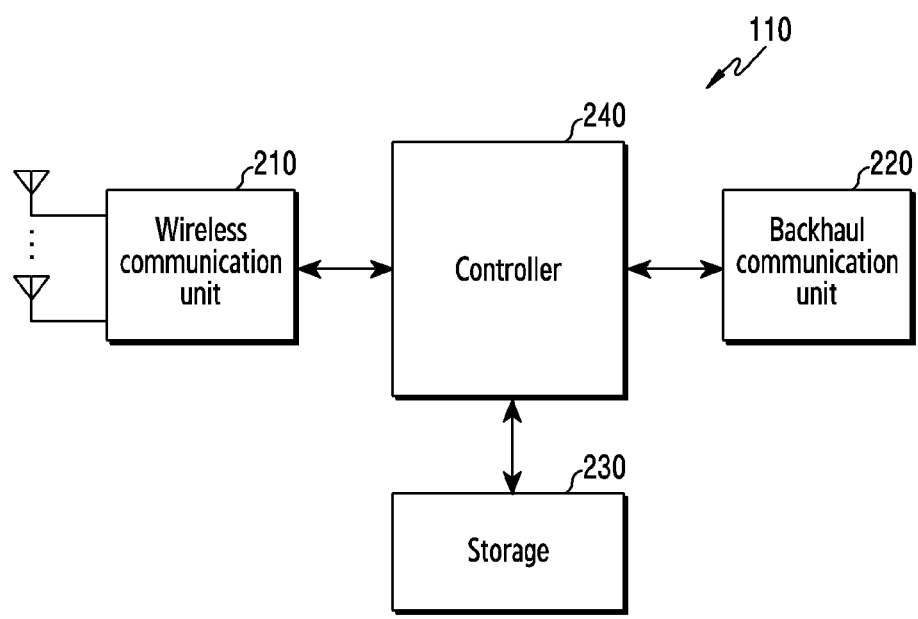
FIG. 2 illustrates a configuration of a base station in a wireless communication system according to various embodiments.

FIG. 2 illustrates a configuration of a base station in a wireless communication system according to various embodiments. The configuration exemplified in FIG. 2 may be understood as a configuration of the base station 110. The terms "~ unit", "~ er", etc., used below denotes the unit of processing at least one function or operation, where such terms may be implemented as hardware or software, or as a combination of hardware and software.

Referring to FIG. 2, the base station includes a wireless communication unit 210, a backhaul communication unit 220, a storage 230, and a controller 240.

The wireless communication unit 210 performs functions for transmitting or receiving a signal through a wireless channel. For example, the wireless communication unit 210 performs a function of conversion between a baseband signal and a bit stream in compliance with the physical layer standard of a system. For example, at the time of data transmission, the wireless communication unit 210 generates complex symbols by encoding and modulating a transmission bit stream. In addition, at the time of data reception, the wireless communication unit 210 reconstructs a reception bit stream by demodulating and decoding a baseband signal.

In addition, the wireless communication unit 210 up converts a baseband signal into a radio frequency (RF) band signal and then transmits the RF band signal through an antenna, and down converts an RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), etc. In addition, the wireless communication unit 210 may include a plurality of transceiving paths. Further, the wireless communication unit 210 may include at least one antenna array including a plurality of antenna elements.

In aspect of hardware, the wireless communication unit 210 may include a digital unit and an analog unit, and the analog unit may include a plurality of sub-units according to an operation power, an operation frequency, etc. The digital unit may be implemented as at least one processor (e.g., a digital signal processor (DSP)).

The wireless communication unit 210 transmits or receives a signal as described above. Therefore, the entire or a part of the wireless communication unit 210 may be denoted as a "transmitter", a "receiver" or a "transceiver". Further, in the following description, transmission and reception performed through a wireless channel are used as a meaning including that the aforementioned processing is performed by the wireless communication unit 210.

The backhaul communication unit 220 provides an interface for performing communication with other nodes in a network. That is, the backhaul communication unit 220 converts a bit stream transmitted from the base station to another node, for example, another connection node, another base station, a higher node, a core network, etc., into a physical signal, and converts a physical signal received from another node, into a bit stream.

The storage 230 stores data, such as a basic program for an operation of the base station, an application program, and configuration information. The storage 230 may include a volatile memory, a non-volatile memory, or a combination of the volatile memory and the non-volatile memory. Further, the storage 230 provides the stored data at the request of the controller 240.

The controller 240 controls overall operations of the base station 110. For example, the controller 240 may transmit or receive a signal through the wireless communication unit 210 or the backhaul communication unit 220. Further, the controller 240 records data in the storage 230, and reads data therefrom. In addition, the controller 240 may perform functions of a protocol stack required in the communication standard. According to another implementation example, a protocol may be included in the wireless communication unit 210. To this end, the controller 240 may include at least one processor.

Figure 3:
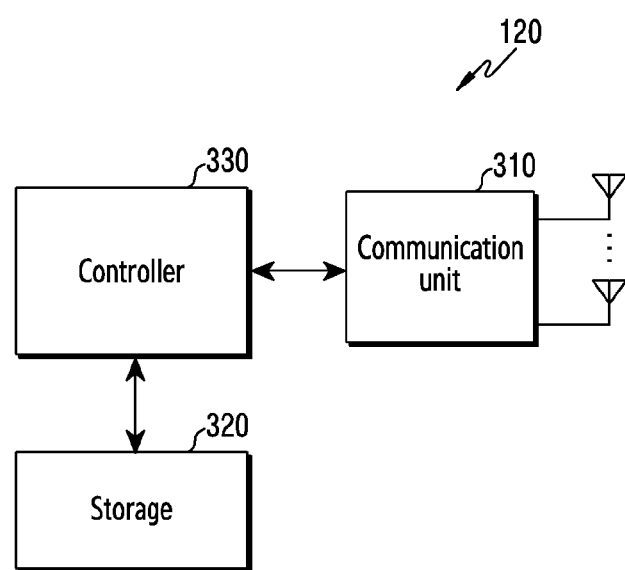
FIG. 3 illustrates a configuration of a terminal in a wireless communication system according to various embodiments.

FIG. 3 illustrates a configuration of a terminal in a wireless communication system according to various embodiments. The configuration exemplified in FIG. 3 may be understood as a configuration of the terminal 120. The terms "~ unit", "~ er", etc. used below represent the unit of processing at least one function or operation, where such terms may be implemented by hardware, software or a combination of hardware and software.

Referring to FIG. 3, the terminal 120 includes a communication unit 310, a storage 320, and a controller 330.

The communication unit 310 performs functions for transceiving a signal through a wireless channel. For example, the communication unit 310 performs a function of conversion between a baseband signal and a bit stream in compliance with the physical layer standard of a system. For example, at the time of data transmission, the communication unit 310 generates complex symbols by encoding and modulating a transmission bit stream. Further, at the time of data reception, the communication unit 310 reconstructs a reception bit stream by demodulating and decoding a baseband signal. Further, the communication unit 310 up converts a baseband signal into an RF band signal and then transmits the RF band signal through an antenna, and down converts an RF band signal received through the antenna into a baseband signal. For example, the communication unit 310 may include a transmission filter, a reception filter, an amplifier, a mixer, an oscillator, a DAC, an ADC, etc.

Further, the communication unit 310 may include a plurality of transceiving paths. Furthermore, the communication unit 310 may include at least one antenna array including a plurality of antenna elements. In an aspect of hardware, the communication unit 310 may include a digital circuitry and an analog circuitry (e.g., a radio frequency integrated circuit (RFIC)). Here, the digital circuitry and the analog circuitry may be implemented as one package. Further, the communication unit 310 may include a plurality of RF chains. Furthermore, the communication unit 310 may perform beamforming.

The wireless communication unit 310 transmits or receives a signal as described above. Therefore, the entire or a part of the wireless communication unit 310 may be denoted as a "transmitter", a "receiver" or a "transceiver". Further, in the following description, transmission and reception performed through a wireless channel are used as a meaning including that the aforementioned processing is performed by the wireless communication unit 310.

The storage 320 stores data, such as a basic program for an operation of the terminal 120, an application program, and configuration information. The storage 320 may consist of a volatile memory, a non-volatile memory, or a combination of the volatile memory and the non-volatile memory. Also, in response to a request of the controller 330, the storage 320 provides the stored data.

The controller 330 controls the general operations of the terminal 120. For example, the controller 330 transmits or receives a signal through the communication unit 310. Further, the controller 330 records data in the storage 320, and reads data therefrom. In addition, the controller 330 may perform functions of a protocol stack required in the communication standard. To this end, the controller 330 may include at least one processor or microprocessor, or be part of the processor. Further, part of the communication unit 310 and the controller 330 may be denoted as a communication processor (CP).

Figure 4:
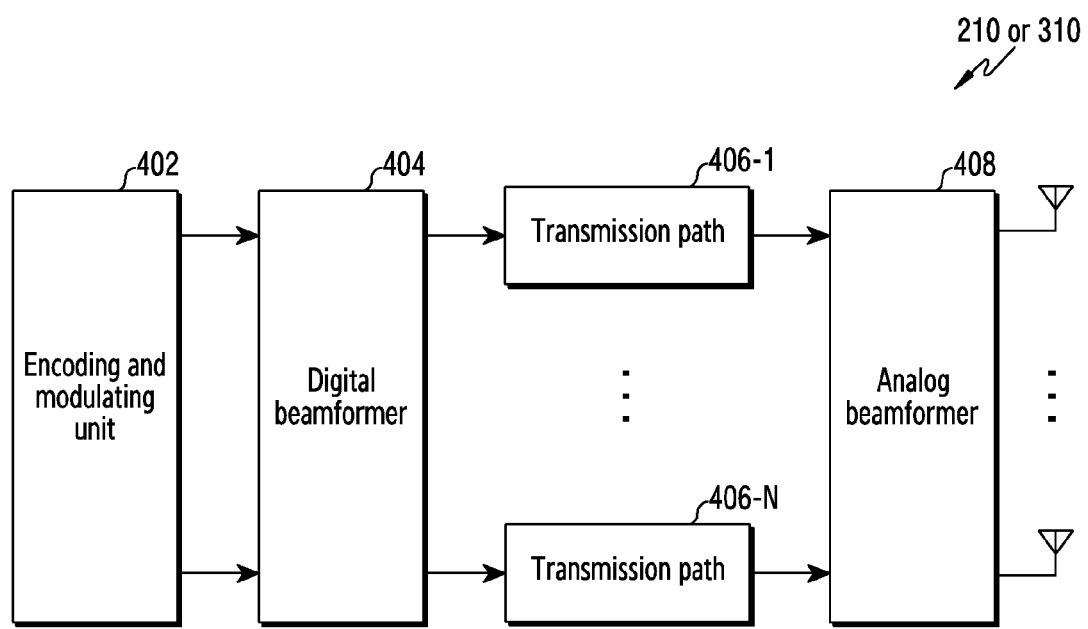
FIG. 4 illustrates a configuration of a communication unit in a wireless communication system according to various embodiments.

FIG. 4 illustrates a configuration of a communication unit in a wireless communication system according to various embodiments. FIG. 4 illustrates an example of a detailed configuration of the wireless communication unit 210 of FIG. 2 or the wireless communication unit 310 of FIG. 3. In detail, FIG. 4 exemplifies elements for performing beamforming, as part of the wireless communication unit 210 of FIG. 2 or the communication unit 310 of FIG. 3.

Referring to FIG. 4, the wireless communication unit 210 or the communication unit 310 includes an encoding and modulating unit 402, a digital beamformer 404, a plurality of transmission paths 406-1 to 406-N, and an analog beamformer 408.

The encoding and modulating unit 402 performs channel encoding. In order to perform the channel encoding, at least one of a low density parity check (LDPC) code, a convolution code, and a polar code may be used. By performing constellation mapping, the encoding and modulating unit 402 generates modulation symbols.

The digital beamformer 404 performs beamforming for a digital signal (e.g., modulation symbols). To this end, the digital beamformer 404 multiplies the modulation symbols by beamforming weights. Here, the beamforming weights are used to alter a magnitude and a phase of a signal, and may be denoted as a "preceding matrix, a "precoder", etc. The digital beamformer 404 outputs the digital beamformed modulation symbols to the plurality of transmission paths 406-1 to 406-N. At this time, according to a multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert a digital beamformed digital signal into an analog signal. To this end, each of the plurality of transmission paths 406-1 to 406-N may include an inverse fast Fourier transform (IFFT) operation unit, a cyclic prefix (CP) inserting unit, a DAC, and an up-converter. The CP inserting unit is for an orthogonal frequency division multiplexing (OFDM) scheme and when another physical layer scheme (e.g., filter bank multi-carrier (FBMC) is applied, the CP inserting unit may be excluded. That is, the plurality of transmission paths 406-1 to 406-N provide an independent signal processing process for a plurality of streams generated through digital beamforming. However, according to an implementation scheme, some of elements of the plurality of transmission paths 406-1 to 406-N may be used for common use.

The analog beamformer 408 performs beamforming for an analog signal. To this end, the digital beamformer 404 multiplies the analog signals by beamforming weights. Here, the beamforming weights are used to alter a magnitude and phase of a signal. Specifically, according to a coupling structure between the plurality of transmission paths 406-1 to 406-N and antennas, the analog beamformer 408 may be configured in various manners. For example, each of the plurality of transmission paths 406-1 to 406-N may be connected to one antenna array. According to another example, the plurality of transmission paths 406-1 to 406-N may be connected to one antenna array. According to another example, the plurality of transmission paths 406-1 to 406-N may be adaptively connected to one antenna array or two or more antenna arrays.

Figure 5:
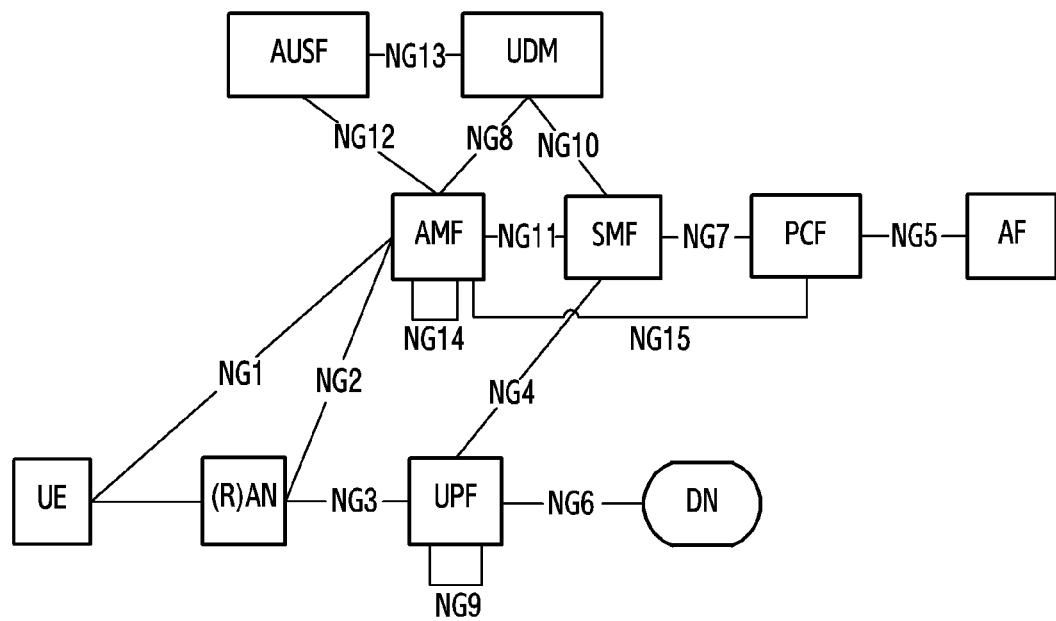
FIG. 5 illustrates an example of a 5G system architecture using reference point representation in a wireless communication system.

FIG. 5 illustrates an example of a 5G system architecture using a reference point representation in a wireless communication system.

Referring to FIG. 5, the 5G system architecture may include various elements (i.e., a network function (NF)), and FIG. 5 exemplifies an authentication server function (AUSF), a (core) access and mobility management function (AMF), a session management function (SMF), a policy control function (PCF), an application function (AF), a unified data management (UDM), a data network (DN), a user plane function (UPF), a (radio) access network (R)AN), user equipment (UE), which correspond to some of the various elements.

Each of NFs supports the following functions.

AUSF stores data for authentication of the UE.

AMF provides a function for UE-specific access and mobility management, and each UE can be connected to one AMF basically.

Specifically, the AMF supports functions, such as inter-CN node signaling for mobility between 3GPP access networks, termination of a radio access network (RAN) CP interface (i.e., NG2 interface), termination of NAS signaling (NG1), NAS signaling security (NAS ciphering and integrity protection), AS security control, registration management (registration area management), connection management, idle mode UE reachability (including control and execution of paging retransmission), mobility management control (subscription and policy), intra-system mobility and inter-system mobility support, network slicing support, SMF selection, lawful intercept (for AMF events and interfaces to LI systems), providing delivery of session management (SM) messages between the UE and the SMF, transparent proxy for routing SM messages, access authentication, access authorization including roaming authorization check, providing delivery of SMS messages between the UE and the SMSF, security anchor function (SAF), and/or security context management (SCM).

Some or all functions of AMF may be supported within a single instance of one AMF.

DN denotes, for example, an operator service, Internet access, or a third party service. The DN transmits a downlink protocol data unit (PDU) to the UPF or receives a PDU transmitted from the UE from the UPF.

PCF receives information on the packet flow from an application server and provides a function of determining the policy of mobility management, session management, etc. Specifically, the PCF supports a unified policy framework for controlling network operation, providing policy rules for CP function (s) (e.g., AMF, SMF, etc.) so as to enforce policy rules, and functions such as front end implementation to access related subscription information for policy decision in user data repository (UDR).

The SMF provides a session management function, and when the UE has a plurality of sessions, the sessions can be managed by different SMFs for each session.

Specifically, the SMF supports functions, such as session management (e.g., establishing, modifying, and releasing sessions, including maintaining tunnels between UPF and AN nodes), assignment and management of UE IP addresses (optionally including authentication), and selection and control of UP functions, configuration of traffic steering to route traffic to an appropriate destination in the UPF, termination of an interface towards policy control functions, enforcement of the control portion of policy and quality of service (QoS), and lawful intercept (for SM events and interfaces to the LI systems), termination of the SM portion of NAS messages, downlink data notification, an initiator of AN specific SM information (delivered to the AN via N2 via AMF), determination of the SSC mode of the session and roaming functions.

Some or all functions of the SMF may be supported within a single instance of one SMF.

UDM stores user subscription data, policy data, etc. The UDM includes two parts: an application front end (FE) and a user data repository (UDR).

The FE includes a UDM FE responsible for location management, subscription management, and credential processing, and the PCF responsible for policy control. The UDR stores data required for the functions provided by the UDM-FE and the policy profile required by the PCF. The data stored in the UDR includes policy data and user subscription data, including subscription identifiers, security credentials, access and mobility related subscription data, and session related subscription data. The UDM-FE accesses subscription information stored in the UDR and supports functions, such as authentication credential processing, user identification handling, access authentication, registration/mobility management, subscription management, and SMS management.

The UPF delivers the downlink PDU received from the DN to the UE via the (R)AN, and delivers the uplink PDU received from the UE via the (R)AN to the DN.

Specifically, the UPF supports functions, such as an anchor point for intra/inter RAT mobility, an external PDU session point of interconnect to a data network, packet routing and forwarding, user plane part of inspection and policy rule implementation, lawful intercept, traffic usage reporting, an uplink classifier for supporting routing of traffic flow to a data network, a branch point for supporting multi-homed PDU session, QoS handling for user plane (e.g., packet filtering, gating, and uplink/downlink rate enforcement), uplink traffic verification (SDF mapping between service data flow (SDF) and QoS flow), transport level packet marking in uplink and downlink, downlink packet buffering and downlink data notification triggering. Some or all functions of the UPF may be supported in a single instance of one UPF.

The AF interacts with a 3GPP core network for providing services (e.g., supporting functions such as application influence on traffic routing, network capability exposure access, and interaction with policy framework for policy control).

The (R)AN is a term collectively referring to new radio access networks supporting both evolved E-UTRAN which is an evolved version of 4G radio access technology and new radio access technology (new radio (NR)) (e.g., gNB).

The gNB supports functions, such as functions for radio resource management (i.e., radio bearer control, radio admission control, connection mobility control, dynamic allocation of resources to a UE on uplink/downlink (i.e., scheduling)), Internet protocol (IP) header compression, encryption of user data stream and integrity protection, selection of AMF at the time of UE attachment when routing to AMF is not determined from information provided to the UE, user plane data routing to UPFs, control plane information routing to AMF, connection setup and release, scheduling and transmission of a paging message (generated from AMF), scheduling and transmission of system broadcast information (generated from AMF or operating and maintenance (O&M)), configuration of measurement and measurement report for mobility and scheduling, transport level packet marking on uplink, session management, support of network slicing, QoS flow management and mapping to data radio bearer, support of UE which is in an inactive mode, a NAS message distribution function, a NAS node selection function, radio access network sharing, dual connectivity, and tight interworking between NR and E-UTRA.

The UE refers to a user equipment. The UE may also be called a terminal, mobile equipment (ME), a mobile station (MS), and the like. Further, the user equipment may be a portable device such as a notebook computer, a cellular phone, a personal digital assistant (PDA), a smartphone, and a multimedia device, or may be a device which is not portable such as a personal computer (PC) and a vehicle-mounted device.

In FIG. 5, for clarity of explanation, an unstructured data storage network function (UDSF), a structured data storage network function (SDSF), a network exposure function (NEF), and an NF repository function (NFF) are not shown, but all NFs shown in FIG. 5 may perform interactions with the UDSF, NEF and NRF as needed.

The NEF provides a means for safely exposing services and capabilities for 3rd party, internal exposure/re-exposure, application function, and edge computing, for example, provided by 3GPP network functions. The NEF receives information (based on exposed capabilities of other network function(s)) from other network function(s). The NEF may store received information as structured data using a standardized interface for data storage network functions. The stored information may be re-exposed to other network functions and application functions by the NEF and used for other purposes such as analysis.

The NRF supports a service discovery function. The NRF receives an NF discovery request from an NF instance and provides discovered information on the NF instance to the NF instance. Further, the NRF maintains available NF instances and services supported by the NF instances.

The SDSF is an optional function for supporting a function of storing and retrieving information as structured data by any NEF.

The UDSF is an optional function for supporting a function of storing and retrieving information as unstructured data by any NF.

Meanwhile, FIG. 5 illustrates a reference model for a case where a UE accesses one DN using one PDU session, for convenience of description, but the disclosure is not limited thereto.

The UE may access two (i.e., local and central) data networks simultaneously using multiple PDU sessions. At this time, two SMFs may be selected for different PDU sessions. However, each SMF may have capability of controlling both local and central UPFs in the PDU sessions.

In addition, the UE may simultaneously access two (i.e., local and central) data networks provided within a single PDU session.

In the 3GPP system, a conceptual link connecting between NFs in the 5G system is defined as a reference point. Reference points included in the 5G system architecture shown in FIG. 5 are exemplified below.

NG1: Reference point between the UE and the AMF
NG2: Reference point between the (R)AN and the AMF
NG3: Reference point between the (R)AN and the UPF
NG4: Reference point between the SMF and the UPF
NG5: Reference point between the PCF and the AF
NG6: Reference point between the UPF and a data network
NG7: Reference point between the SMF and the PCF
NG8: Reference point between the UDM and the AMF
NG9: Reference point between two core UPFs
NG10: Reference point between the UDM and the SMF
NG11: Reference point between the AMF and the SMF
NG12: Reference point between the AMF and the AUSF
NG13: Reference point between the UDM and the authentication server function (AUSF)
NG14: Reference point between two AMFs
NG15: Reference point between the PCF and the AMF in the case of a non-roaming scenario and reference point between the PCF and the AMF in a visited network in the case of a roaming scenario A wireless communication system defines a NextGen core (NG core), which is a new core network, as the wireless communication system evolves from a 4G system to a 5G system. The new core network virtualizes all existing network entities (NEs) into network functions (NFs). In addition, the new core network separates a mobility management entity (MME) function into mobility management (MM) and user session management (SM), and terminal mobility management has levels according to the usage type of terminal.

The 5G wireless communication system can support various terminals/services. Examples of terminals/services supported by the 5G system include enhanced mobile broadband (eMBB), ultra-reliable low-latency communications (URLLCs), and massive machine type communications (mMTCs). The respective terminals/services above have different requirements for the core network. The eMBB service requires a high data rate, and the URLLC service requires high stability and low latency.

URLLC service requires high service stability (ultra-reliable communication) and low latency (low latency communication). For example, when a terminal performing a URLLC service transmits data, the end-to-end delay within a few milliseconds to tens of milliseconds is required for enabling transmission. To this end, the PDU session for the URLLC service needs to be established as an always-on PDU session without deactivation/activation of the user plane.

Various embodiments provide a method and apparatus for performing data transmission with high service stability and low latency when a wireless network user uses an URLLC service.

This disclosure proposes an always-on PDU session-related handling for URLLC communication in a 5G next generation core network.

Specifically, when a PDU session is established for the URLLC service, since additional time is required to activate/deactivate the user plane, the PDU session for the URLLC service needs to be established as an always-on PDU session. In this case, if the UE establishes a PDU session, which is to be established, as a general PDU session, without recognizing that the PDU session is the PDU session for the URLLC service, a method for handling the general PDU session in a network is required. In addition, although the PDU session is established as a general PDU session, a method for changing the general PDU session to an always-on PDU session is required because a URLLC QoS flow occurs. To this end, the disclosure provides a method and apparatus for handling an always-on PDU session for an URLLC service in a network.

Figure 6:
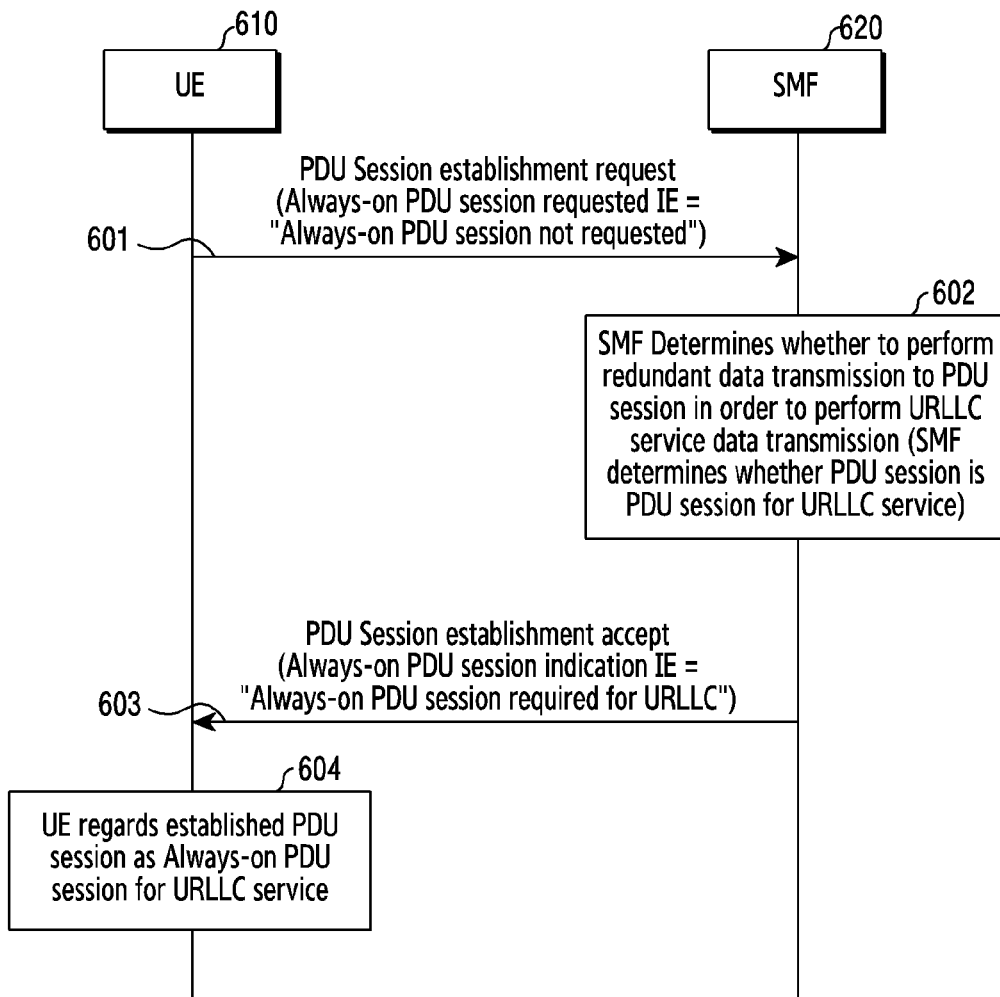
FIG. 6 illustrates an example of a process of generating a PDU session for an URLLC service in a wireless communication system according to various embodiments.

FIG. 6 illustrates an example of a process of generating a PDU session for an URLLC service in a wireless communication system according to various embodiments.

When the UE establishes a PDU session, knowing whether or not the corresponding PDU session is a PDU session for an URLLC service is up to the UE implementation. FIG. 6 illustrates an example of a case in which the UE 610 does not recognize the established PDU session as a PDU session for an URLLC service and requests a general PDU session from the SMF 620.

In operation 601, when the UE 610 establishes a general PDU session, a value of always-on PDU session requested information element (IE), which is included in the PDU session establishment request message transmitted by the UE 610 to the SMF 620, is configured as "Always-on PDU session not requested".

In operation 602, the SMF 620, which has received the PDU session establishment request message from the UE 610, determines whether the PDU session is a PDU session for an URLLC service, based on PDU session related policy information received from the policy control function (PCF), local policy configuration, the value of single network slice selection assistance information (S-NSSAI)/data network name (DNN) transmitted by the UE, and user subscription information. The SMF 620 determines whether to perform redundant transmission of data to a PDU session in order to perform transmission of URLLC service data. That is, the SMF 620 determines whether the PDU session is the PDU session for the URLLC service.

If, in operation 602, the SMF determines that the PDU session, which has received the establishment request message from the UE 610, is the PDU session for the URLLC service, the SMF 620 configures the always-on PDU session indication IE value of a PDU session establishment accept message as "always-on PDU session required for URLLC" and transmits the "always-on PDU session required for URLLC" to the UE, in operation 603.

In operation 604, the UE, which has received the PDU session establishment accept message, regards the established PDU session as an always-on PDU session for an URLLC service.

TABLE 1

| 8 | 7 | 6 | 5 | 4 | 3 | 2 | 1 |
|---|---|---|---|---|---|---|---|
| Always-on PDU session indication IEI | | | | 0 Spare | 0 Spare | APSI | APSI octet 1 |

TABLE 2

| Always-on PDU session indication (APSI) (octet 1) | |
|---|---|
| Bit 1 | |
| 0 | Always-on PDU session not allowed |
| 1 | Always-on PDU session required |
| Bit 2 | |
| 0 | Always-on PDU session not allowed for URLLC |
| 1 | Always-on PDU session required for URLLC |
| Bits 3 and 4 are spare and shall be coded as zero, | |

<Table 1> and <Table 2> represent information element (IE) coding of the always-on PDU session indication IE. The always-on PDU session indication IE has a size of 1 octet and uses two bits. The first bit indicates "Always-on PDU session not allowed" and "Always-on PDU session required". The second bit indicates "Always-on PDU session not allowed for URLLC" and "Always-on PDU session required for URLLC".

TABLE 3

| 8 | 7 | 6 | 5 | 4 | 3 | 2 | 1 |
|---|---|---|---|---|---|---|---|
| Always-on PDU session requested IEI | | | | 0 Spare | 0 Spare | APSR | APSR octet 1 |

TABLE 4

| Always-on PDU session requested (APSR) (octet 1) | |
|---|---|
| Bit 1 | |
| 0 | Always-on PDU session not requested |
| 1 | Always-on PDU session requested |
| Bit 2 | |
| 0 | Always-on PDU session not requested for URLLC |
| 1 | Always-on PDU session requested for URLLC |
| Bits 3 and 4 are spare and shall be coded as zero, | |

<Table 3> and <Table 4> represent information elements (IE) coding of the always-on PDU session requested IE. The always-on PDU session requested IE has a size of 1 octet and uses two bits. The first bit indicates "Always-on PDU session not requested" and "Always-on PDU session requested". The second bit indicates "Always-on PDU session not requested for URLLC" and "Always-on. PDU session requested for URLLC".

Figure 7:
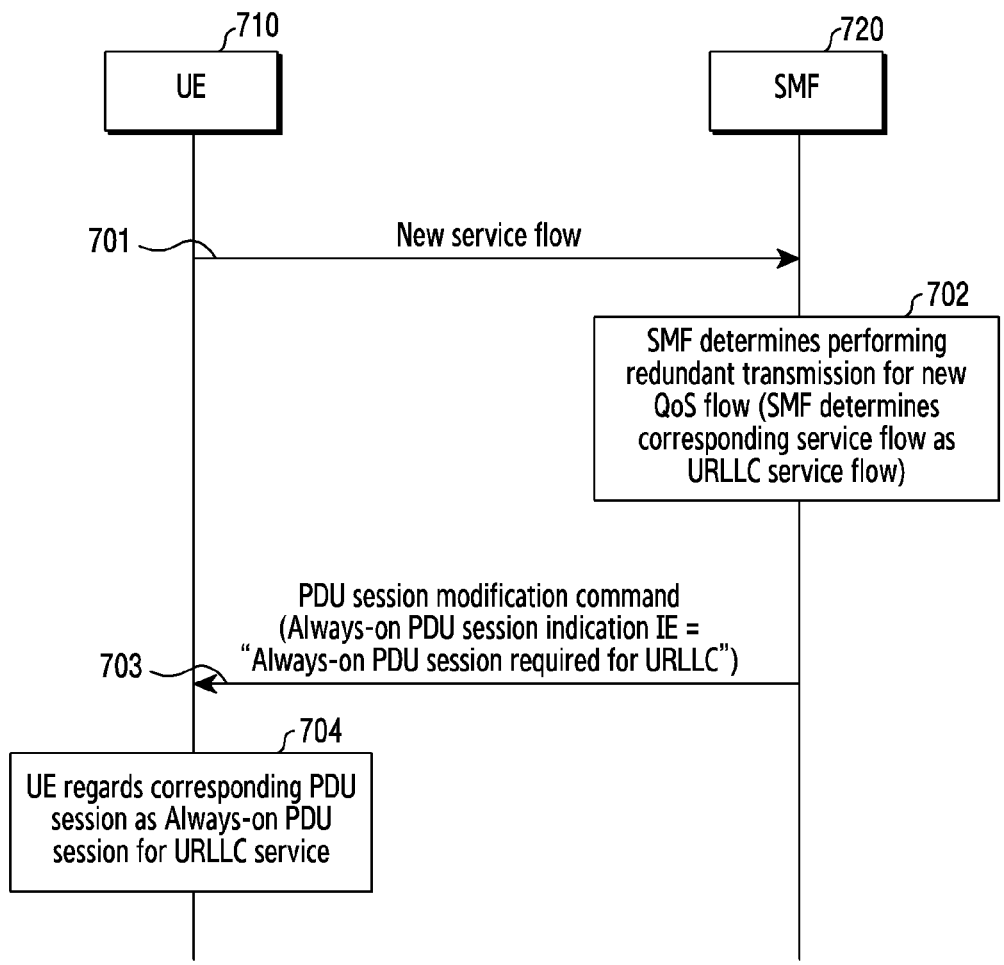
FIG. 7 illustrates an example of a PDU session modification process of changing an existing PDU session to an always-on PDU session in a wireless communication system according to various embodiments.

FIG. 7 illustrates an example of a PDU session modification process of changing an existing PDU session to an always-on PDU session in a wireless communication system according to various embodiments.

Referring to FIG. 7, in operation 701, the UE 710 requests new data transmission (service flow/QoS flow).

In operation 702, the SMF 720 determines whether to support URLLC service based on an authorized 5G QoS indicator (5QI) of the requested QoS flow, NG-RAN node capability, and/or operator configuration. That is, the SMF 720 determines whether to perform redundant transmission for a new QoS flow. The SMF 720 may determine the new QoS flow as an URLLC service flow.

In operation 703, if the SMF 720 determines the corresponding QoS flow as an URLLC service flow, and if the current PDU session is not an always-on PDU session, the SMF 720 needs to change a PDU session, through which the QoS flow is transmitted, to an always-on PDU session. To this end, the SMF 720 configures an always-on PDU session indication IE of a PDU session modification command message as "always-on PDU session required for URLLC" and transmits the "always-on PDU session required for URLLC" to the UE.

In operation 704, the UE 710, which has received the PDU session modification command message, regards the corresponding PDU session as an always-on PDU session for the URLLC service.

Figure 8:
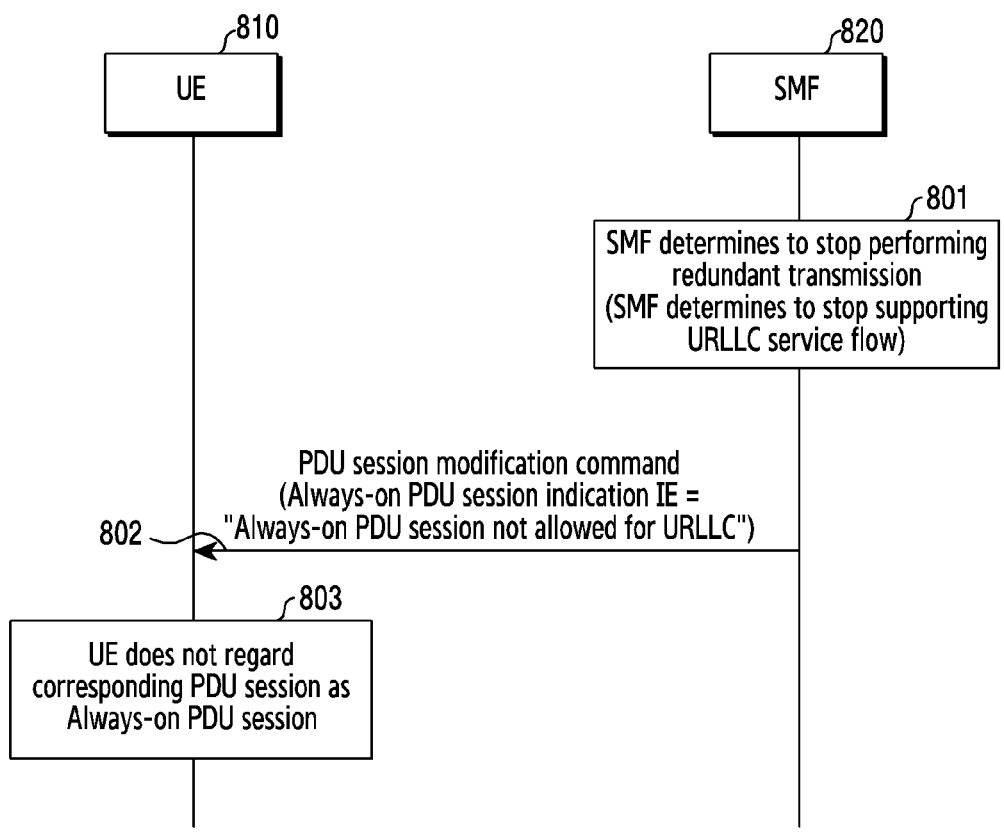
FIG. 8 illustrates an example of a PDU session modification process of changing an always-on PDU session to a general PDU session in a wireless communication system according to various embodiments.

FIG. 8 illustrates an example of a PDU session modification process of changing an always-on PDU session to a general PDU session in a wireless communication system according to various embodiments.

Referring to FIG. 8, in operation 801, the SMF 820 determines to no longer support the URLLC service. That is, the SMF 820 determines to stop performing redundant transmission. At this time, if the current PDU session is an always-on PDU session for URLLC, the SMF 820 needs to change the always-on PDU session to a general PDU session. If the current PDU session is an always-on PDU session for another purpose, the SMF does not need to change the always-on PDU session to a general PDU session.

In operation 802, the SMF 820 configures an always-on PDU session indication IE of a PDU session modification command message as an "always-on PDU session not allowed for URLLC" and transmits the "always-on PDU session not allowed for URLLC" to the UE.

Upon receiving the PDU session modification command message, the UE regards that the corresponding PDU session is no longer the always-on PDU session for the URLLC service.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a user equipment (UE) in a wireless communication system, the method comprising:
    transmitting, to a session management function (SMF), a protocol data unit (PDU) session establishment request message of a PDU session without requesting an always-on PDU session;
    receiving, from the SMF, a PDU session establishment accept message with an Always-on PDU session indication information element (IE) set to "Always-on PDU session required", in case that the PDU session is determined to be established for ultra-reliable low latency communication (URLLC) based on local policy configuration in the SMF; and
    in response to the PDU session establishment accept message with the Always-on PDU session IE set to "Always-on PDU session required", establishing the PDU session as an always-on PDU session for URLLC.

2. The method of claim 1,
    in case that the PDU session establishment request message includes an always-on PDU session requested IE, the PDU session establishment accept message includes an always-on PDU session indication IE based on whether the PDU session is determined to be established for URLLC.

3. The method of claim 1, wherein whether the PDU session is to be established for URLLC is determined by the SMF.

4. The method of claim 1,
    wherein establishing the PDU session as the always-on PDU session for the URLLC is performed based on whether the PDU session establishment accept message includes an always-on PDU session indication IE set to "Always-on PDU session required".

5. A user equipment (UE) in a wireless communication system, the UE comprising:
    a transceiver; and
    at least one processor operably coupled with the transceiver, and configured to:
    transmit, to a session management function (SMF), a protocol data unit (PDU) session establishment request message of a PDU session without requesting an always-on PDU session;
    receive, from the SMF, a PDU session establishment accept message with an Always-on PDU session indication information element (IE) set to "Always-on PDU session required", in case that the PDU session is determined to be established for ultra-reliable low latency communication (URLLC) based on local policy configuration in the SMF; and
    in response to the PDU session establishment accept message with the Always-on PDU session IE set to "Always-on PDU session required", establish the PDU session as an always-on PDU session for URLLC.

6. The UE of claim 5,
    in case that the PDU session establishment request message includes an always-on PDU session requested IE, the PDU session establishment accept message includes an always-on PDU session indication IE based on whether the PDU session is determined to be established for URLLC.

7. The UE of claim 5, wherein whether the PDU session is to be established for URLLC is determined by the SMF.

8. The UE of claim 5,
    wherein the at least one processor is configured to establish the PDU session as the always-on PDU session for the URLLC based on whether the PDU session establishment accept message includes an always-on PDU session indication IE set to "Always-on PDU session required".

* * * * *